Patented Oct. 30, 1934

1,978,820

UNITED STATES PATENT OFFICE 1,978,820

MANUFACTURE OF LEUCO INDIGO

Kenneth Herbert Saunders, Blackley, Manchester, England, assignor to Imperial Chemical Industries Limited, Westminster, England No Drawing. Application April 7, 1930, Serial No. 442,447. In Great Britain April 8, 1929

2 Claims. (Cl. 260—50)

This invention relates to an improved process for the catalytic reduction of indigo to leucoindigo, and comprises the employment of a special form of nickel catalyst which enables the process to be converted into a continuous one. The special form is a pervious body of rigid character, that is rigid or semi-rigid, comprising a carrier having fixed on the surface thereof, nickel in active form.

My new and advantageous process comprises continuously passing, in the presence of hydrogen, an alkaline aqueous suspension of indigo through such a pervious body, and collecting the leuco indigo solution thus formed. The pervious nature of the said body permits the aqueous suspension to pass through the same; and the rigid character thereof prevents the nickel catalyst from being dispersed in the leuco indigo solution obtained in my process. Thus, subsequent separation of the catalyst and other solids from the leuco indigo solution by the filtration or settling method is eliminated and the catalytic material thus fixed in place so that the continuous operation of the process is feasible.

It is well known to reduce an alkaline suspension of indigo to its leuco derivative by means of hydrogen acting in the presence of a catalyst. The most effectual catalyst known for this purpose is nickel and the suspending medium is commonly water.

The process described or implied in the accounts of the art hitherto disclosed is one worked on the batch system. Batches of a suitable nickel salt, for instance the basic carbonate, either supported or not supported on a carrier, are prepared, reduced and added to the calculated batch of alkaline indigo, after which reduction is carried out with hydrogen in the known manner usually under small pressure.

Since the manufacture of the basic carbonate, which under most industrial conditions is the cheapest nickel salt to use, involves solution of nickel sulphate, precipitation, washing and drying, and must be followed by reduction it is found in practice that the plant and labor necessary for making the catalyst are nearly as great as those involved in the actual reduction of the indigo. Lastly, when reduction of the indigo is complete, a troublesome filtration, or clarification followed by filtration, is requisite in order to remove the used nickel catalyst.

I have now found that by using a catalyst, in the form of a pervious bed of rigid character, such prior difficulties are effectively and advantageously eliminated and instead of using a batch process I use a new and advantageous continuous process. The catalyst is active nickel and is fixed on, and supported by, a rigid or semi-rigid carrier. The carrier may be in the form of a granular, reticulate, or matted mass. The active nickel is a reduced nickel, and it may be advantageously fixed on the said carrier, being reduced in situ. For instance I may use granular charcoal or carborundum as the carrier. Such granular carriers easily form masses, beds or bodies which are pervious and have rigid or semi-rigid character. The reduced nickel may be fixed on such carriers easily and quickly. For instance, carborundum granules may be treated with a suitable nickel salt and then the treated granules subjected to calcination and reduction to fix the active nickel upon such granules. Again, nickel wool may be used as a carrier. Such nickel wool is sufficiently rigid in character and is sufficiently pervious to be advantageous in my process. Such nickel wool may be slightly oxidized to give surface oxidation and then the oxidized surface reduced in hydrogen at a suitable temperature to form a surface coating of reduced or active nickel. When the carrier is electrically conductive, an electrical current may be used in heating said carrier in the preparation and regeneration of the nickel catalyst. The catalyst may, if desired, contain alumina as an activator.

By continuous operation according to my invention it becomes possible to reduce labor charges; to avoid manufacturing fresh finely divided nickel catalyst for successive batches; and to obviate filtering out or otherwise removing spent catalyst.

In carrying my invention into effect I prepare for example cages containing nickel wool with which I pack a vertical cylindrical reaction vessel suitably heated and capable of withstanding pressure. It may be advantageous to work under a considerable pressure of hydrogen as reaction velocity is thereby increased and the effects of the gradual loss of activity of the catalyst counteracted. I may use pressure up to 200 atmospheres or more, and a temperature from 120° to 140° C. Into and through the hot reaction vessel containing compressed hydrogen I force a steady stream of alkaline indigo paste at such a rate that reduction is complete by the time percolation to the bottom of the cylinder has taken place. Here the hot leucoindigo solution collects in a receiver and is drawn off through a valve. Alternatively, I force the stream of alkaline indigo paste upwards through a catalytic mass and I keep a hydrogen stream continuously circulating. I may pre-heat the indigo mixture prior to admitting it into the reaction vessel.

Further I find it advantageous to add a proportion of leuco indigo to the alkaline indigo paste. This addition has the dual object of removing oxygen from the water of the paste and of decreasing the viscosity of the alkaline indigo paste, so that higher concentrations of indigo may be employed during reduction.

Having now particularly described and ascertained the nature of my said invention and in what manner the same is to be performed, I declare that what I claim is:—

1. In the manufacture of leuco indigo by a continuous process which includes continuously passing, in the presence of hydrogen, an aqueous alkaline suspension of indigo through a pervious body of rigid character, said body comprising a nickel catalyst fixed on a carrier, the step which comprises adding a small amount of leuco indigo to said aqueous alkaline suspension of indigo before passing said suspension through the pervious catalytic body.

2. In the manufacture of leuco indigo by a continuous process, the step which comprises simultaneously passing, under pressure, hydrogen and an alkaline suspension of indigo through a pervious body of rigid character said body including a nickel catalyst containing alumina.

KENNETH HERBERT SAUNDERS.